(12) United States Patent
McCarville et al.

(10) Patent No.: US 7,998,299 B2
(45) Date of Patent: Aug. 16, 2011

(54) METHOD FOR MAKING COMPOSITE TRUSS PANEL HAVING A FLUTED CORE

(75) Inventors: Douglas A. McCarville, Orting, WA (US); Juan C. Guzman, Seattle, WA (US); Michael L. Hand, Huntington Beach, CA (US); Michael J. Robinson, Huntington Beach, CA (US)

(73) Assignee: The Boeing Company, Chicago, IL (US)

( * ) Notice: Subject to any disclaimer, the term of this patent is extended or adjusted under 35 U.S.C. 154(b) by 326 days.

(21) Appl. No.: 12/243,926

(22) Filed: Oct. 1, 2008

(65) Prior Publication Data

US 2010/0080941 A1   Apr. 1, 2010

(51) Int. Cl.
*B32B 37/00* (2006.01)
(52) U.S. Cl. .................................. 156/189; 156/191
(58) Field of Classification Search .......... 156/189–195; 428/117, 176–179, 188
See application file for complete search history.

(56) References Cited

U.S. PATENT DOCUMENTS

| | | | |
|---|---|---|---|
| 3,240,644 A | 3/1966 | Wolff | |
| 3,339,326 A * | 9/1967 | Derr et al. | 52/309.11 |
| 3,432,859 A | 3/1969 | Jordan et al. | |
| 3,544,417 A * | 12/1970 | Corzine | 428/104 |
| 3,573,144 A * | 3/1971 | Anderson | 428/48 |
| 3,779,487 A * | 12/1973 | Ashton et al. | 244/123.5 |
| 3,795,559 A * | 3/1974 | Horn et al. | 156/152 |
| 3,943,980 A | 3/1976 | Rheaume | |
| 3,965,942 A * | 6/1976 | Hatch | 139/384 R |
| 4,051,289 A | 9/1977 | Adamson | |
| 4,055,268 A | 10/1977 | Barthel | |
| 4,132,577 A * | 1/1979 | Wintermantel | 156/156 |
| 4,154,363 A | 5/1979 | Barthel | |
| 4,223,053 A | 9/1980 | Brogan | |
| 4,366,917 A | 1/1983 | Kotcharian | |
| 4,461,398 A | 7/1984 | Argy | |
| 4,617,072 A | 10/1986 | Merz | |
| 4,835,975 A | 6/1989 | Windecker | |
| 5,025,943 A | 6/1991 | Forsman | |
| 5,061,542 A * | 10/1991 | Brace | 428/121 |
| 5,118,555 A * | 6/1992 | Horovitz | 428/178 |
| 5,150,812 A | 9/1992 | Adams | |
| 5,419,139 A | 5/1995 | Blum et al. | |
| 5,469,686 A | 11/1995 | Pykiet | |
| 5,879,498 A | 3/1999 | Lemons | |
| 5,904,972 A * | 5/1999 | Tunis et al. | 428/178 |
| 6,178,754 B1 | 1/2001 | Dujarric | |
| 6,207,256 B1 | 3/2001 | Tashiro | |
| 6,375,125 B1 | 4/2002 | Kirn et al. | |
| 6,743,504 B1 * | 6/2004 | Allen et al. | 428/362 |
| 7,296,769 B2 | 11/2007 | Hogenson et al. | |

OTHER PUBLICATIONS

PCT Report US 2009/059290, The Boeing Company, Jan. 14, 2010.
Published article entitled: "An Update on Composite Tanks for Cryogens", By Sara Black, Technical Editor | Nov. 2005, which can be found at http://www.compositesworld.com/hpc/issues/2005/November/1069.

(Continued)

*Primary Examiner* — Jeff H Aftergut
(74) *Attorney, Agent, or Firm* — Tung & Associates (57) ABSTRACT

A composite truss structure employs a sandwich-in-sandwich construction in which a composite fluted core is sandwiched between two facesheets, and at least one structural foam stiffener is sandwiched within the core or between the facesheets and/or the core.

18 Claims, 8 Drawing Sheets

OTHER PUBLICATIONS

Lockheed Martin: (X-34)—in situ fiber placement (ISFP)—preheat, no debulking, oven cure, unlined composite (IM7/8552, IM&/F650 BMI and IM&/5250-4 BMI).

Northrop Grumman: Next Generation Launch Technology—ultrasonic tape lamination (UTL) 2.5 mil material used on inner skin, debulking, oven cure, permeation barrier (epoxy adh, AL. foil, epoxy adh.), perforated aramid core.

Wilson Composites: U.S. Air Force Contracts—no liner, material patent pending microcrack resistant fiber/resin system, RTM bosses.

XCOR Aerospace: NASA's Exploration Systems Research and Technology program—filament wound Teflon/S2, Rohacell PMI foam .25-several inches, ouer shell material as needed.

HyPerComp::NASA SBIR—filament wound Zylon/polyurethane and HEI 535 epoxy/T1000, aluminum liner, oven cure.

* cited by examiner

METHOD FOR MAKING COMPOSITE TRUSS PANEL HAVING A FLUTED CORE

TECHNICAL FIELD

This disclosure generally relates to composite structures, and deals more particularly with a sandwich-in-sandwich composite truss panel having a fluted core, as well as a method for making the truss panel.

BACKGROUND

Aerospace vehicles typically require lightweight structural members that maximize payload carrying capacity and mission capabilities. For example, launch and space exploration vehicles often make use of composite materials in areas such as heat shields, nose cones and payload fairings in order to reduce weight while satisfying performance requirements. In order to further reduce vehicle weight, additional components such as cryogenic fuel tanks used to store pressurized propellants may be fabricated from composite materials. However, the use of composite materials for fuel tanks is challenging because of the severe environmental conditions to which the components of the tank may be subjected, as well as possible chemical incompatibilities, the cryogenic temperatures of propellants, extreme temperature cycling, long term permeability and requirements for damage tolerance.

Previous attempts at fabricating composite cryogenic pressure vessels have employed either a perforated honeycomb sandwich, a foam sandwich, or a laminated fluted sandwich. Laminated fluted designs had a number of disadvantages, including the need to use relative thick walls in order to carry the required compression and shear loads.

Honeycomb designs may also have various disadvantages, including their relatively heavy weight, and their reduced flatwise tensile strength and shear strength and impact resistance. Moreover, honeycomb designs rely on core-to-laminate bonds whose quality may not be nondestructively ascertained, and may be more difficult to tailor to particular shapes. Finally, over time, volatile fuels may permeate through the inner facesheet into the area between the cell walls. During launch or re-entry, as temperatures increase, permeated volatiles trapped within the core may begin to pressurize. In order to reduce the pressure build-up, others have proposed to perforate or slot the cell walls which allow excess gaseous build-up to be purged by circulating dry air or an inert gas through the sandwich panel. Perforation of the core cell walls in this manner, however, may reduce the shear, compression and bending strength of the panel.

Accordingly, there is a need for an improved panel design that overcomes the problems discussed above that may be tailored to produce components such as fuel tanks having a variety of shapes.

SUMMARY

The disclosed embodiments provide a composite truss and method for making the same employing a composite sandwich-in-sandwich truss structure (SISTS) in which a composite fluted core is sandwiched between two facesheets and includes integral, lightweight foam stiffeners. The lightweight foam stiffeners employ a low density, high temperature structural foam that increases the overall structural properties of the truss panel, including buckling, bending, impact resistance and insulation. The improved performance of the truss panel may reduce the required number of core flutes and/or facesheet composite plies, thus reducing weight. The use of the high temperature low density foam for both structural load carrying and thermal insulation may permit the use of thinner thermal protection systems (TPS) on the exterior surfaces of the panel. The hollow geometry of the fluted core allows any fuel vapors trapped in the core to be readily purged, and the use of foam adjacent the inner facesheet of the panel may be used to control purge gas temperatures. The SISTS panel structure may allow the use of optimized combinations of high temperature capable polymers and toughened matrix resin systems in a single part to achieve an optimal combination of weight savings, cost reduction, and structural performance. Finally, the use of low density foam in the outer and/or flute walls may permits the various layers of the panel to be thermally isolated.

According to one disclosed embodiment, a composite truss panel structure comprises: first and second composite facesheets; a fluted core sandwiched between the first and second facesheets; and, at least one stiffener between the first and second facesheets formed of a low density structural foam. The low density structural foam may be a high temperature foam having a density between approximately 2 and 6 pounds per cubic foot. The foam stiffener may be sandwiched between the fluted core and one of the facesheets, or may be sandwiched between walls of the flutes forming the core.

According to another disclosed embodiment, a composite truss panel comprises: a first sandwich including first and second facesheets in a fluted core sandwiched between and joined to the first and second facesheets; and, a second sandwich disposed within the first sandwich, the second sandwich including at least one structural foam stiffener. The fluted core includes walls extending between the first and second facesheets, and the second sandwich includes adjacent ones of walls of the fluted core.

According to a disclosed method embodiment, making a composite truss panel comprises: forming a plurality of composite flutes; placing the flutes between the first and second facesheets; joining the flutes to the first and second facesheets; and, sandwiching at least one structural foam stiffener between the first and second facesheets. The flutes may be formed by wrapping composite material around each of a plurality of members, and sandwiching the at least one structural foam stiffener may include placing the stiffener between the walls of adjacent ones of the flutes.

According to another method embodiment, making a composite truss panel comprises: forming a composite fluted core; forming a first sandwich by placing the fluted core between first and second facesheets; and, forming a second sandwich by placing at least one structural foam stiffener between walls of the fluted core. Forming the fluted composite core may include wrapping composite prepreg around each of the plurality of mandrels, and stacking the wrapped mandrels together. Forming the second sandwich may include sandwiching structural foam stiffeners respectively between adjacent walls of the wrapped mandrels. The method may further comprise co-curing the first and second facesheets and the fluted core, and removing the mandrels after the first and second facesheets and the fluted core have been co-cured.

The disclosed embodiments satisfy the need for a composite truss panel having a fluted core and method for making the same that provides a lightweight, high strength structure suitable for use in a variety of components used in launch and space exploration vehicles, and capable of withstanding cryogenic temperatures and rapid temperature changes.

Other features, benefits and advantages of the disclosed embodiments will become apparent from the following description of embodiments, when viewed in accordance with the attached drawings and appended claims

BRIEF DESCRIPTION OF THE ILLUSTRATIONS

DETAILED DESCRIPTION

Figure 1:
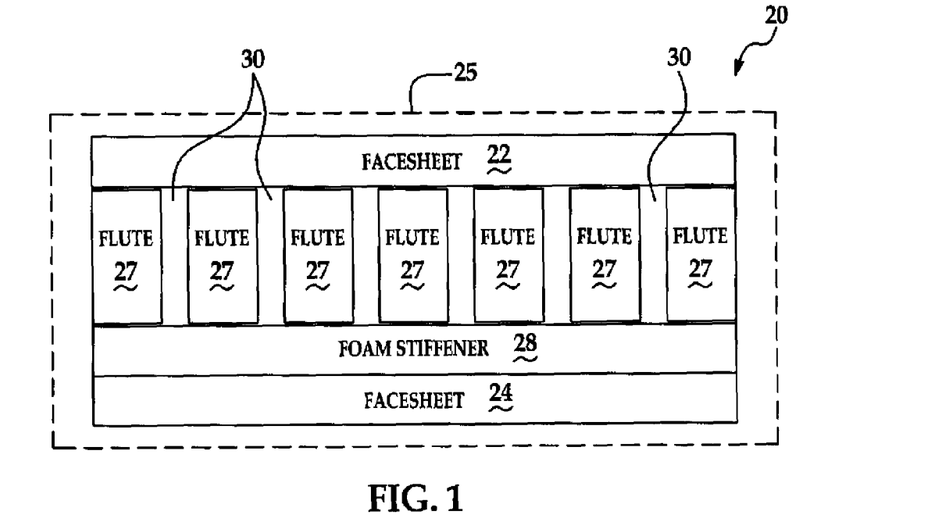
FIG. 1 is a functional block diagram of composite truss panel having a fluted core.
Figure 3:
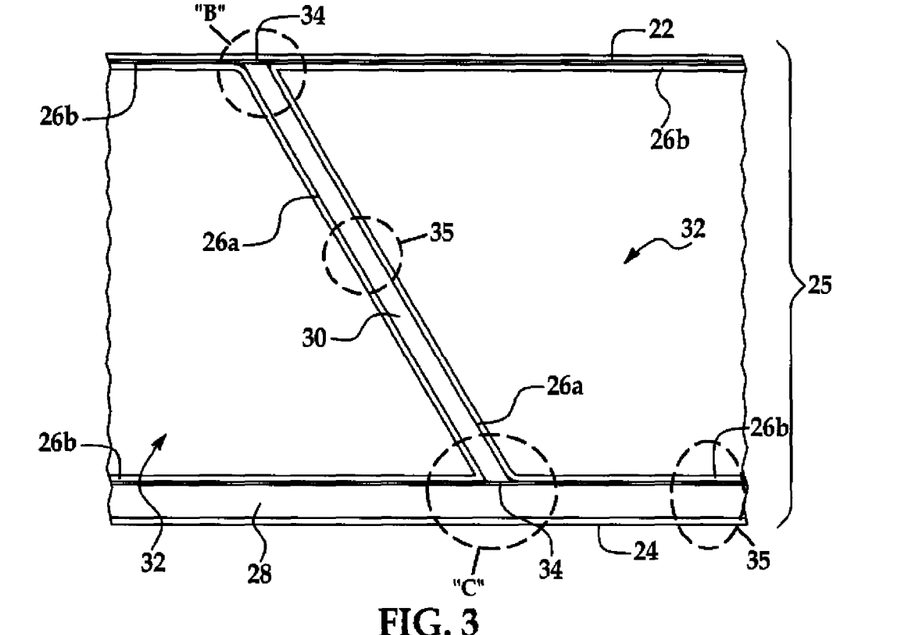
FIG. 3 is an enlarged view of the area designated as "A" in FIG. 2.

Referring first to FIGS. 1, and 3, the disclosed embodiments generally relate to a composite truss panel 20 which may be used to form a variety of structures such as without limitation, a cryogenic fuel tank (not shown) for aerospace vehicles.

The truss panel 20 broadly comprises a first sandwich 25 that includes a fluted core 26 sandwiched between first and second, generally parallel facesheets 22, 24, and a second sandwich 35. As will be discussed later, in some embodiments, the facesheets 22, 24 may not be parallel to each other. Each of the facesheets 22, 24 may comprise one or more plies of a fiber reinforced resin, such as carbon fiber epoxy. In a cryogenic fuel tank application, facesheet 22 may comprise an inside wall of the tank, while the facesheet 24 forms the outer wall. As will be discussed below in more detail, each of the flutes 27 may also be formed from a fiber reinforced resin material which may comprise one or more plies of a woven or knitted fabric that is cured to form a lightweight high strength core structure.

The fluted core 26 comprises a series of hollow, isosceles trapezoidal flutes 27 alternately arranged between facesheets 22, 24. As best seen in FIG. 1a, each of the flutes 27 includes inclined side walls 26a that extend traverse to the planes of facesheets 22, 24, and top and bottom walls 26b which extend substantially parallel and are adjacent to the facesheets 22, 24. The truss-like walls 26a, 26b provide improved structural properties in terms of tensile, compression, shear and bending strengths. By virtue of their hollow construction, each of the flutes 27 includes an interior passageway 32 that extends the length of the flute 27 and thus may allow fluids or gases to flow therethrough. It should be noted here that although the flutes 27 have been illustrated as having an isosceles trapezoidal cross sectional shape, a variety of other geometric shapes are possible, including those in which the walls 26a extend substantially normal to the facesheets 22, 24.

The panel 20 includes one or more lightweight structural foam stiffeners indicated by the numerals 28 and 30 which are sandwiched between other components of the truss panel 20 to form at least one second sandwich 35. Each of the stiffeners 28, 30 may comprise a lightweight, low density structural foam that may have a density between approximately 2 and 6 pounds per cubic foot. In space launch and exploration vehicle applications, such as fuel tanks, the foam may be a high temperature foam suitable for temperatures up to approximately 300 degrees F. or more, while in terrestrial applications, the foam may be suitable for temperatures up to approximately 180 degrees F. Examples of suitable foams include, without limitation, polymethacrylimide (PMI) and polyisocyanurate.

Figure 2:
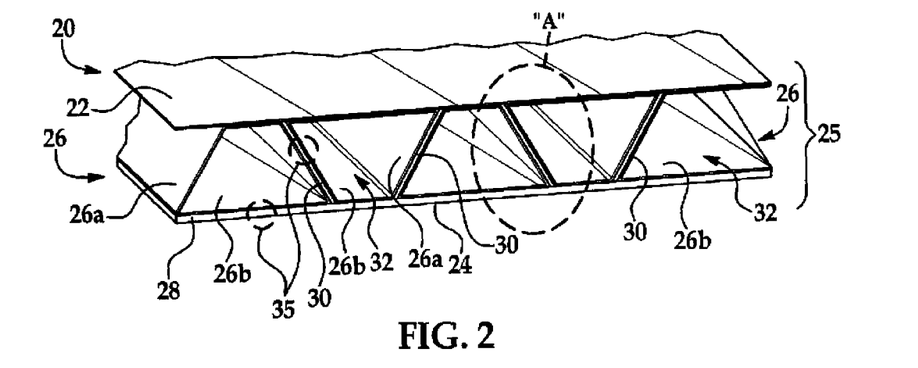
FIG. 2 is an isometric illustration of one embodiment of the composite truss panel having a fluted core.
Figure 2A:
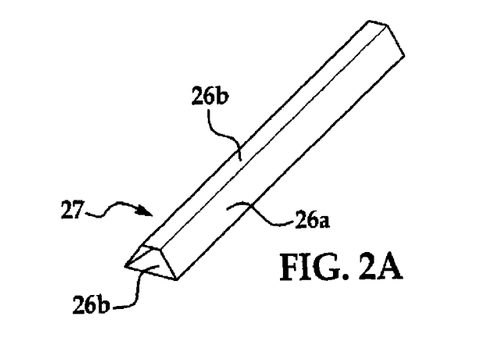
FIG. 2a is an isometric illustration of a flute forming part of the fluted core shown in FIG. 1.

In the embodiment illustrated in FIGS. 1-3, the stiffeners 30 are sandwiched between adjacent walls 26a of the flutes 27 to form a second sandwich 35 within the first sandwich 25, thus forming a sandwich-in-sandwich construction. It should be noted here that while the adjacent walls 26a of the flutes 27 are shown as being flat in the illustrated embodiment with a substantially constant thickness, such walls 26a and/or the stiffeners 30 may have other shapes. For example, the walls 26a, and/or the stiffeners 30 may be tapered or have one or more joggles (not shown) therein. Moreover, in some embodiments, the adjacent walls 26a may not be parallel to each other, but instead may diverge from, or converge toward each other, in which case the stiffeners 30 sandwiched between the walls 26a may be tapered to substantially match the shape of the space between the walls 26a of adjacent flutes 27.

Placement of the foam stiffeners between the flute walls 26a may increase the overall panel bending stiffness while increasing weight only minimally. The foam stiffeners 30 within the flute walls 26a can also be used to tailor/control heat flow between the facesheets 22, 24. The stiffener 28 is sandwiched between the facesheet 24 and the bottom of the fluted core 26 that is formed by the bottom walls 26b of the flutes 27, thereby also forming a second sandwich 35. As shown in FIG. 2, in those applications where the facesheets 22, 24 may be pre-cured, adhesive film 34 may be used to assist in bonding facesheet 22 to the core 26, and in bonding the facesheet 24 to the stiffener 28.

The use of the foam stiffeners 28, 30 sandwiched at various locations between the facesheets 22, 24, to form a second sandwich 35 within the first sandwich 25 may provide both thermal and acoustic isolation benefits, while potentially increasing impact damage tolerance, and therefore may have both a structural and insulating function. As a result, in cryogenic fuel tank applications, it may be possible to reduce the amount of parasitic thermal protective nonstructural foam that may otherwise be needed on the exterior of the tank walls.

Figure 4A:
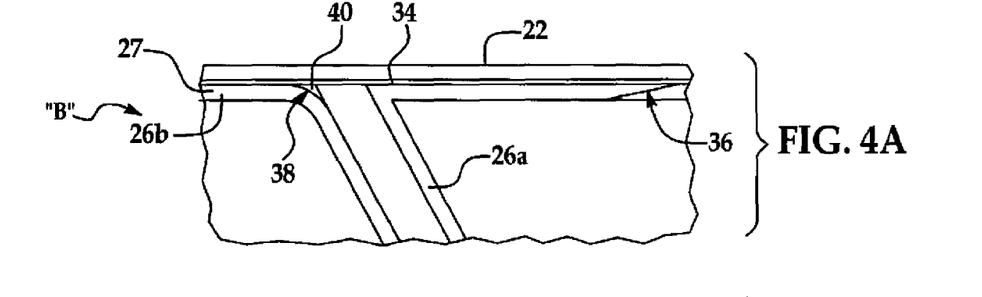
FIGS. 4a and 4b are enlarged views of the areas designated as "B" and "C" respectively in FIG. 3.
Figure 4B:
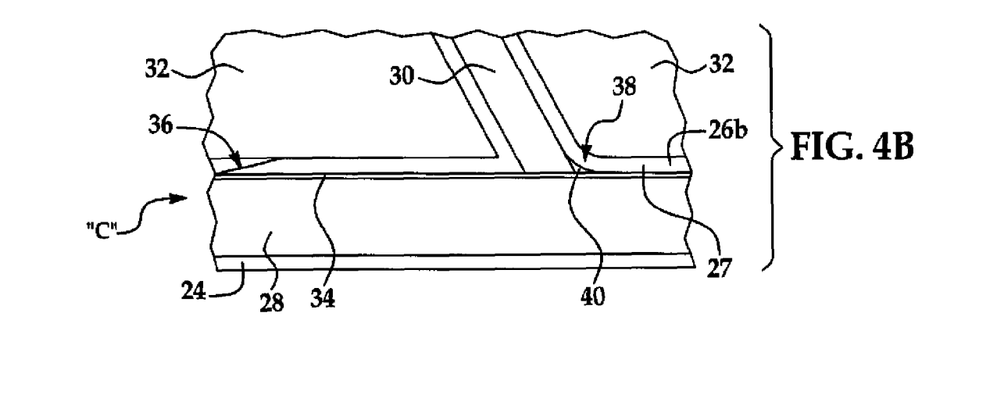

Referring now to FIGS. 4a and 4b, each of the flutes 27 may have a radius 38 at the junction of the side walls 26a and top walls 26b. The radius 38 may form a gap (not shown) that may be filled with a radius filler 40 in order to assure that a void is not present between the truss core 26 and the facesheet 22. Depending upon the method used to form the individual flutes 27, a diagonal splice 36 may be provided which represents a scraf joint formed by the overlapping plies forming the individual flutes 27.

Figure 5:
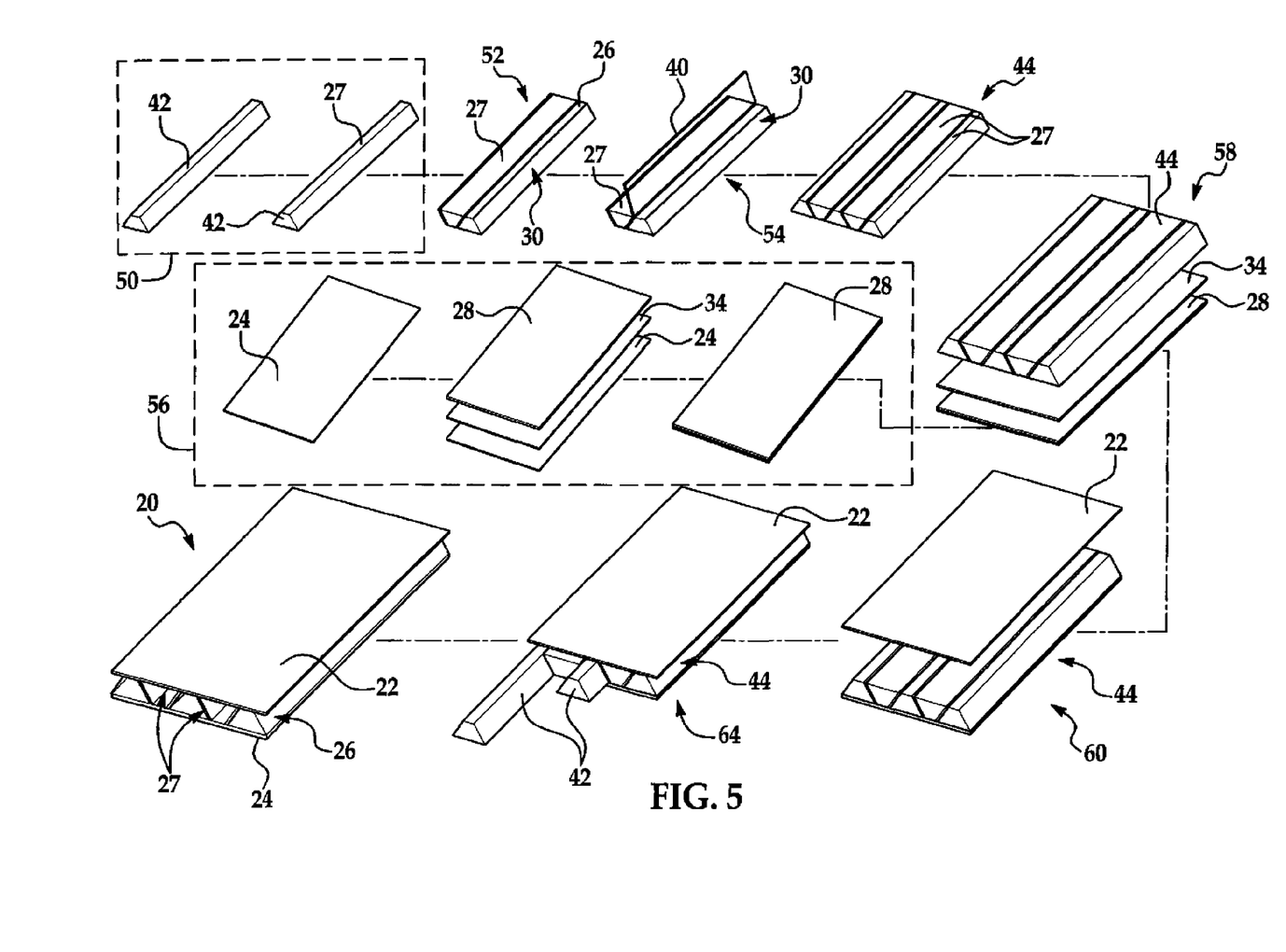
FIG. 5 is a perspective illustration showing components of the composite truss panel in progressive stages of assembly.
Figure 7:
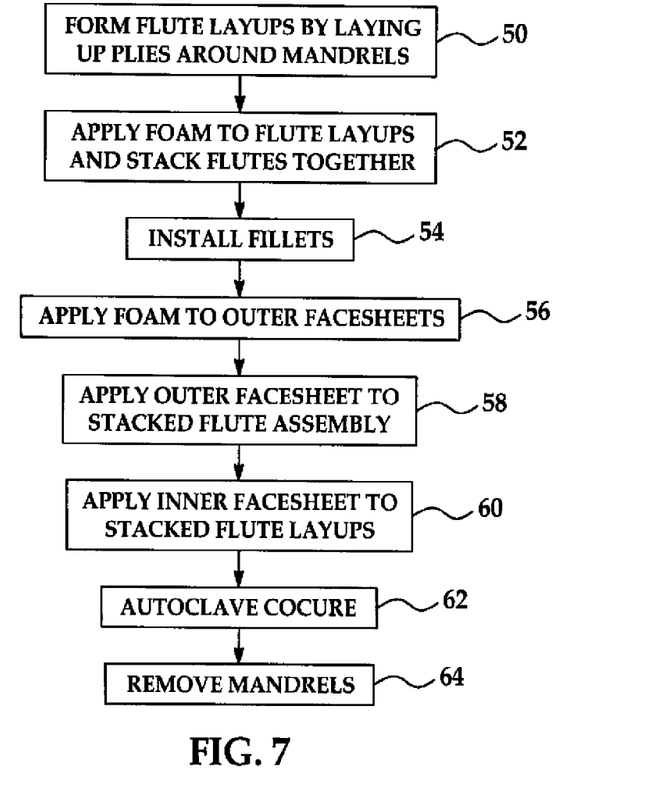
FIG. 7 is a flow diagram illustrating a method for making the composite truss panel.

Attention is now directed to FIGS. 5 and 7 which illustrate a method for making the composite truss panel shown in FIG. 2. At 50, a mandrel 42 is provided that has a cross sectional shape substantially matching that of the interior of the individual flutes 27. The mandrels 42 may comprise, for example and without limitation, inflatable tooling such as a silicone rubber bladder or hard tooling formed of rubber aluminum or Teflon™. The mandrel 42 preferably has a relatively high coefficient of thermal expansion (CTE). The mandrels 42 provide support during layup of the individual flutes 27. One or more plies (not shown) of fiber reinforced prepreg, which may comprise knitted or woven cloth sheets of carbon fiber epoxy are then laid up over each of the mandrels 42 by knitting, wrapping, or drape forming. The high CTE of the mandrels 42 results in the mandrels expanding slightly during a subsequent cure process in an autoclave which assists in applying compaction pressure to the flute layups. Mandrel expansion also helps facilitate the removal of layup initiated trapped air and volatiles that may arise during the cure cycle.

Next, at 52, the foam stiffeners 30 are placed on the sidewalls 26 of the flutes 27, and the flutes 27 are then stacked together in side-by-side relationship, sandwiching the stiffeners 30 between adjacent ones of the flutes 27. In the case of the exemplary isosceles trapezoidal shaped flutes 27, the individual flutes 27 are alternately inverted as they are stacked in order to arrange their side walls 27a in face-to-face relationship. Sandwiching of the foam stiffeners 30 between adjacent walls 26a of the flutes 27 assists in increasing the buckling strength of the flute walls 26a, while potentially increasing impact damage tolerance, and may thus reduce the amount of wrap plies required to form the flutes 27.

Figure 6:
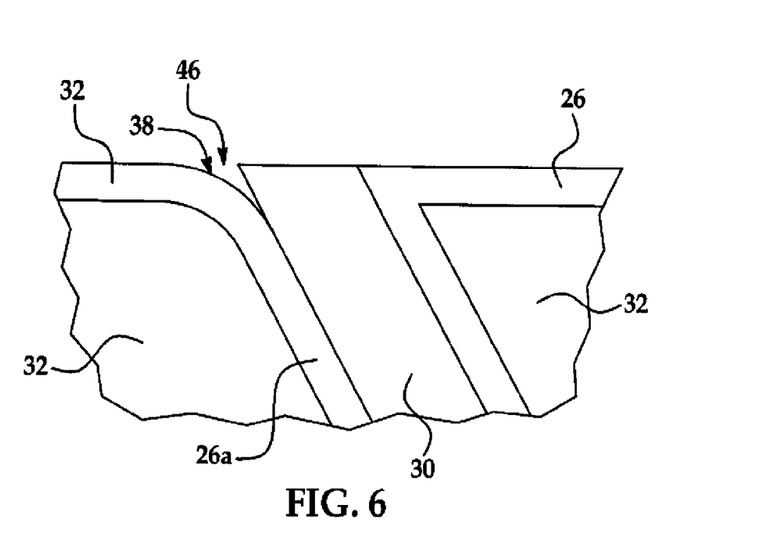
FIG. 6 is an end view showing a gap between a radius on a flute and a foam stiffener.

At this point, as shown in FIG. 6, gaps 46 may be present between the end of each stiffener 30 and the radius 38 of each of the flutes 27. In order to fill the gaps 46, a radius filler 40 (also known as a fillet or noodle) is placed into the gaps 46 as shown at step 54. The radius fillers 40 may be formed of a polymer adhesive or prepreg tape and extend down the entire length of the individual flutes 27. The radius fillers aid in the subsequent wrapping process which may prevent stress concentrations within the structure. When the gaps 46 have been filled with the fillers 40, a core assembly 44 is complete.

Next, as shown at 56, facesheet 24 may be laid up either by hand or using a fiber replacement machine (not shown). A foam stiffener 28 in the form of a foam sheet may then be applied to the facesheet 24, using an adhesive film 34. Where the facesheet 24 forms an outer skin requiring higher temperature capability, the facesheet 24 may be pre-cured. The assembly of the stiffener 28 and facesheet 24 may be either co-bonded or secondarily bonded to the core subassembly 44 using a film adhesive 34, as shown at step 58.

Next, as shown at 60, facesheet 22 may be joined to the other face of the core subassembly 44 using either bonding techniques or by co-curing. Then, at 62, the assembled panel 20 is placed in an autoclave (not shown) which cures the assembly using high temperature/pressure with suitable cycles that maximize removal of volatiles and reduce the porosity of the laminate walls. After autoclave curing at 62, the mandrels 42 may be removed, as shown at step 64. The final panel 20 may then be trimmed and inspected as may be required.

Figure 8:
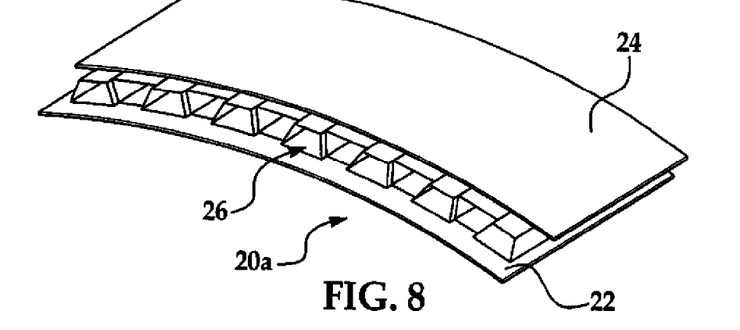
FIG. 8 is a perspective view illustrating an alternate embodiment of the composite truss panel.
Figure 9:
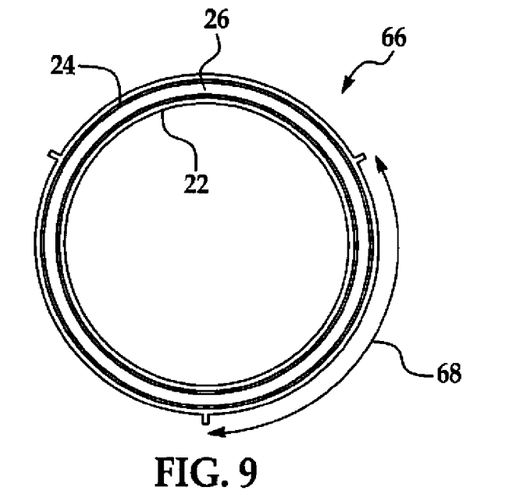
FIG. 9 is a sectional view of a container formed from composite truss panels of the type shown in FIG. 7.

Referring now to FIGS. 8 and 9, in some applications a curved composite truss panel 20a may be required in order to form, for example, a cylindrical fuel tank 66 shown in FIG. 8. The curved truss panel 20a may comprise segments 68 that are joined together to form the walls of the tank 66. In this application, the mandrels shown in FIG. 5 may include suitable curvatures (not shown) that result in a core 26 having a curvature that matches the curvature of the tank 66. Appropriate tooling (not shown) may be required for laying up and assembling the facesheets 22, 24 and fluted core 26.

Figure 10:
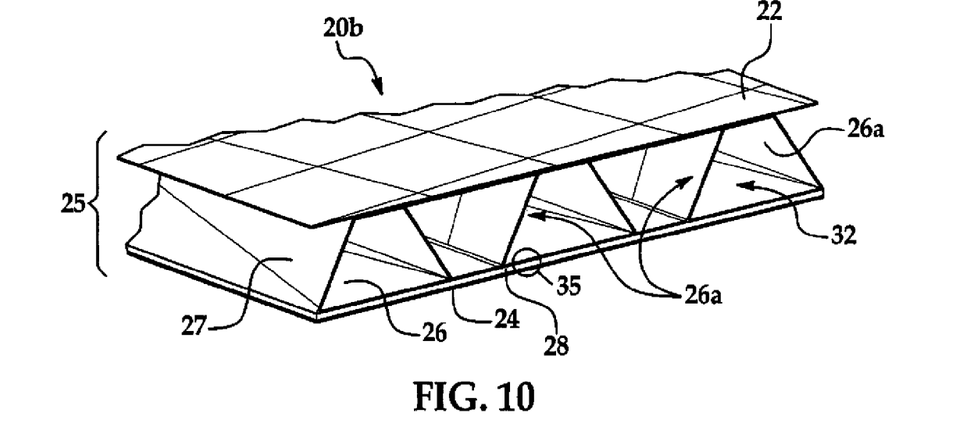
FIG. 10 is an isometric view of an alternate embodiment of the composite truss panel.

The high temperature, low density stiffeners 28, 30 previously discussed may be sandwiched between the facesheets 22, 24 at various locations to form the second sandwich 35 shown in FIGS. 1-3. For example, as shown in FIG. 10, a stiffener 28 may be advantageously sandwiched between the core 26 and the facesheet 24 which forms the outer wall of the panel 20b. In this example, foam stiffeners are not sandwiched between the walls 26a of the individual flutes 27.

Figure 11:
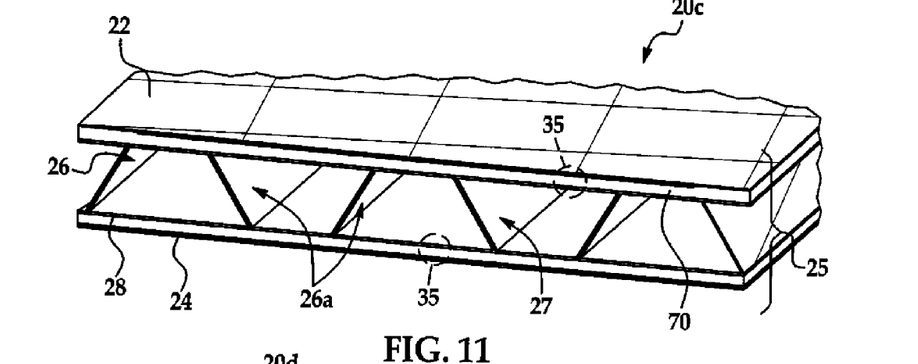
FIG. 11 is an isometric illustration of another embodiment of the composite truss panel.

FIG. 11 illustrates another embodiment of the truss panel 20c in which low density foam stiffeners 28, 70 are sandwiched respectively between the core 26 and the facesheets 22, 24. The presence of the foam stiffeners 28, 70 between the core 26 and the facesheets 22, 24 may increase the bending stiffness of the truss panel 20c. In this example, similar to the truss panel 20b shown in FIG. 10, foam stiffeners are not present between the walls 26a of the individual flutes 27.

Figure 12:
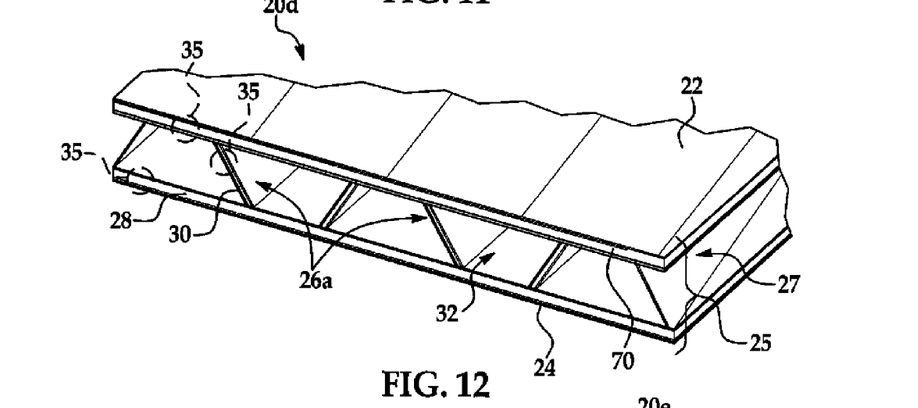
FIG. 12 is an isometric illustration of a further embodiment of the composite truss panel.

FIG. 12 illustrates a further embodiment of the truss panel 20d which is similar to panel 20c shown in FIG. 11, except that foam stiffeners 30 are also sandwiched between adjacent walls 26a of the flutes 27.

Figure 13:
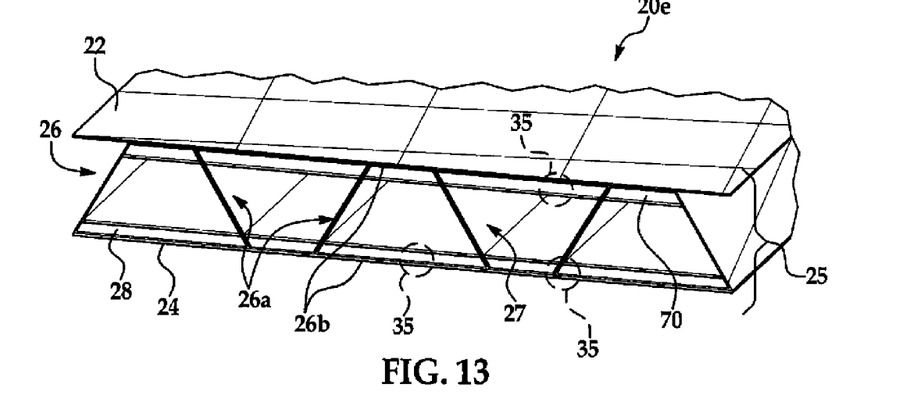
FIG. 13 is an isometric illustration of another embodiment of the composite truss panel.

FIG. 13 illustrates another embodiment of the truss panel 20e in which the top and bottom walls 26b of the flutes 27 are in face-to-face contact with one of the facesheets 22, 24, and foam stiffeners 28, 70 are disposed inside each of the flutes 27, such that each of the walls 26b is sandwiched between a stiffener 28, 70 and one of the facesheets 22, 24. Similarly, each of the sidewalls 26a is sandwiched between adjacent ones of the stiffeners 28, 70.

Figure 14:
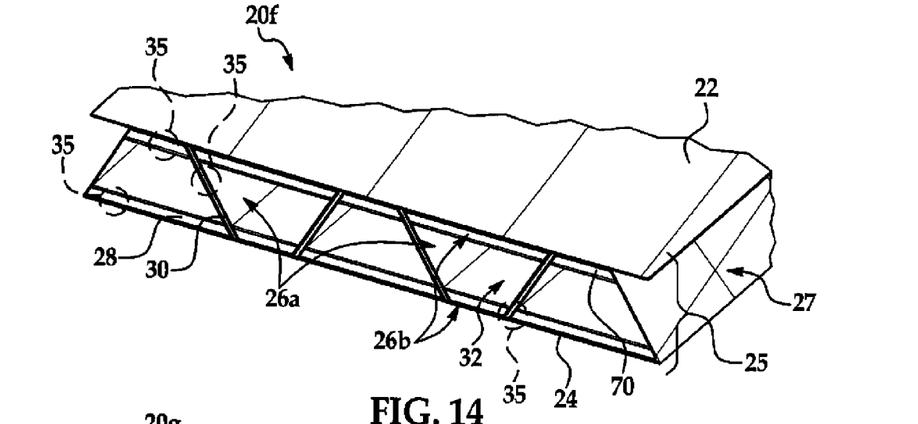
FIG. 14 is an isometric illustration of a further embodiment of the composite truss panel.

FIG. 14 illustrates still another embodiment of the truss panel 20f which is similar to the embodiment 20e shown in FIG. 13, except that foam stiffeners 30 are also present between the adjacent walls 26a of the flutes 27. The embodiments 20e and 20f shown in FIGS. 13 and 14 may stiffen the core 26 and improve the pull-off strength of the panel 20.

Figure 15:
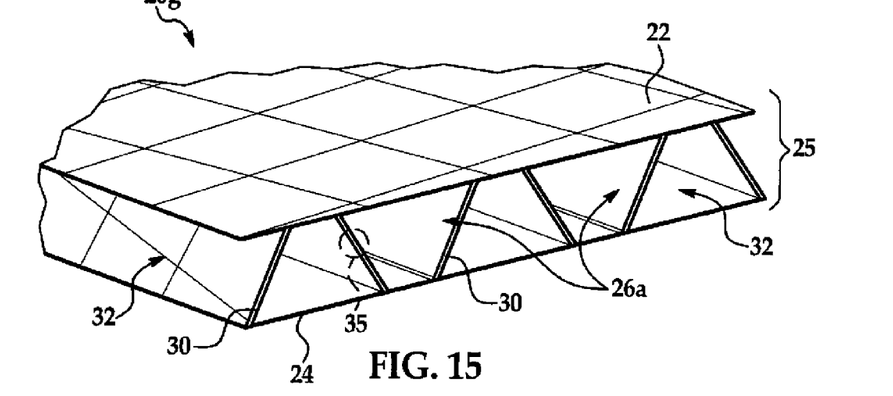
FIG. 15 is an isometric illustration of another embodiment of the composite truss panel.

Finally, as shown in FIG. 15, in yet another embodiment of the truss panel 20g, foam stiffeners 30 are sandwiched only between the adjacent walls 26a of the individual flutes 27.

Figure 16:
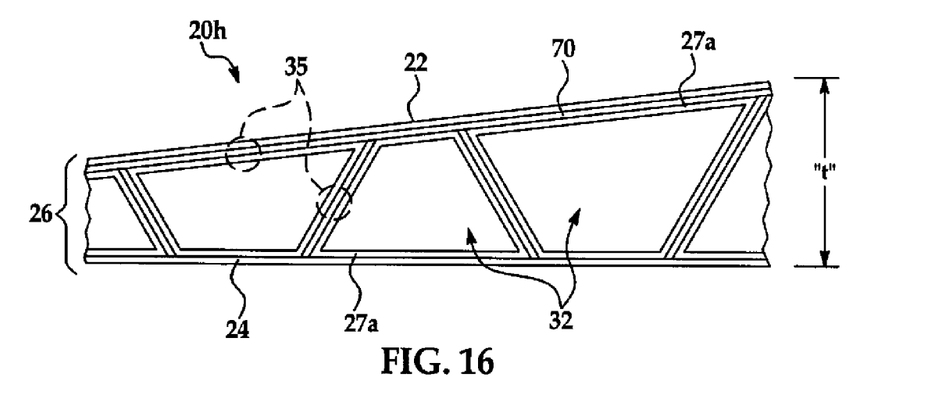
FIG. 16 is a cross sectional illustration of a further embodiment of the composite truss panel.

In some embodiments, the facesheets 22, 24 may not be parallel to each other. For example, as illustrated in FIG. 16, the facesheets 22, 24 may diverge away (or toward) each other, forming a truss panel 20h that has a varying thickness "t". In this embodiment, the flutes 27a may have a similar overall shape, but differing dimensions so that the fluted core 26 is tapered to substantially match the varying thickness "t" of the panel 20f. Although not shown in the drawings, the truss panel 20 may have one or more joggles therein.

The various embodiments of the truss panel 20 described above provide inner and outer laminates in the flute walls 26a that may carry most of the bending loads (tension and compression), while the foam stiffeners 28, 30, 70 may carry most of the compression and shear loads. Depending on the embodiment of the truss panel 20, the fluted core 26 may carry most of the compression and shear loads of the entire panel, and the foam stiffeners 28, 30, 70 may carry most of the bending loads of the entire panel.

The use of the a foam stiffener 28 on inner wall of the facesheet 24 in the embodiments shown in FIGS. 2, 10, 11, 12, 13 and 14, may improve impact damage tolerance and may assist in providing overall system insulation and thereby help control purge gas temperatures. The impact damage tolerance performance and the level of system insulation may vary with the density of the foam stiffeners 28. Placing the foam stiffener 70 on the inner wall of the facesheet 22 in the embodiments shown in FIGS. 11-14, may provide overall system insulation and may reduce the need for parasitic tank thermal protection in cryogenic fuel tank applications. Additionally, placing the foam stiffener on the inner wall of the facesheet 22 may allow the use of higher temperature capable resin systems. For example Bismaleimides (BMI) may be used on the outer surfaces of a cryogenic fuel tank while maintaining the ability to use lower cost/more durable resin systems in most other areas of the tank.

Figure 17:
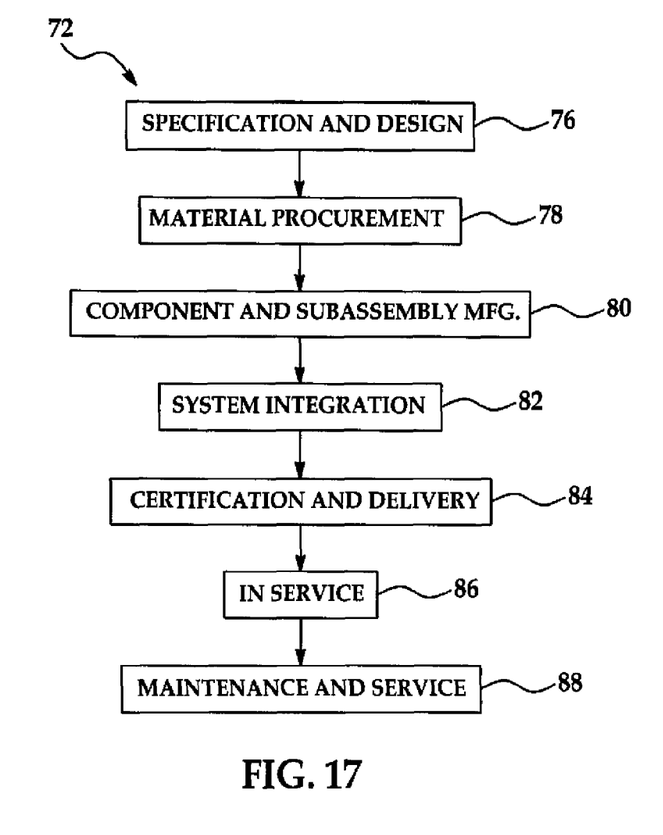
FIG. 17 is a flow diagram of aircraft production and service methodology.
Figure 18:
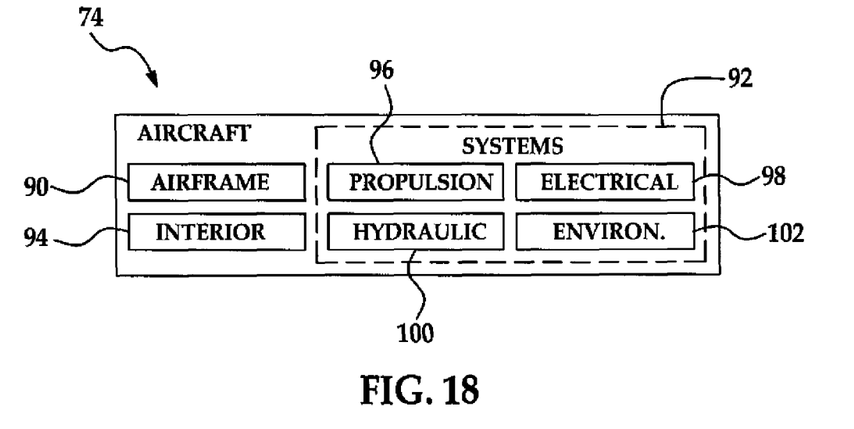
FIG. 18 is a block diagram of an aircraft.

Embodiments of the disclosure may find use in a variety of potential applications, particularly in the transportation industry, including for example, aerospace, marine and automotive applications. Thus, referring now to FIGS. 17 and 18, embodiments of the disclosure may be used in the context of an aircraft manufacturing and service method 72 as shown in FIG. 17 and an aircraft 74 as shown in FIG. 18. During pre-production, exemplary method 72 may include specification and design 76 of the aircraft 74 and material procurement 78. During production, component and subassembly manufacturing 80 and system integration 82 of the aircraft 74 takes place. Thereafter, the aircraft 74 may go through certification and delivery 84 in order to be placed in service 86. While in service by a customer, the aircraft 74 is scheduled for routine maintenance and service 88 (which may also include modification, reconfiguration, refurbishment, and so on).

Each of the processes of method 72 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 18, the aircraft 74 produced by exemplary method 72 may include an airframe 90 with a plurality of systems 92 and an interior 94. Examples of high-level systems 92 include one or more of a propulsion system 96, an electrical system 98, a hydraulic system 100, and an environmental system 102. Any number of other systems may be included. Although an aerospace example is shown, the principles of the disclosure may be applied to other industries, such as the marine and automotive industries.

Systems and methods embodied herein may be employed during any one or more of the stages of the production and service method 72. For example, components or subassemblies corresponding to production process 80 may be fabricated or manufactured in a manner similar to components or subassemblies produced while the aircraft 74 is in service. Also, one or more apparatus embodiments, method embodiments, or a combination thereof may be utilized during the production stages 80 and 82, for example, by substantially expediting assembly of or reducing the cost of an aircraft 74. Similarly, one or more of apparatus embodiments, method embodiments, or a combination thereof may be utilized while the aircraft 74 is in service, for example and without limitation, to maintenance and service 88.

Although the embodiments of this disclosure have been described with respect to certain exemplary embodiments, it is to be understood that the specific embodiments are for purposes of illustration and not limitation, as other variations will occur to those of skill in the art.

What is claimed is:

1. A method of making a composite truss panel, comprising:
   forming a plurality of composite flutes;
   placing the flutes between the first and second facesheets;
   joining the flutes to the first and second facesheets; and,
   sandwiching at least one structural foam stiffener between first and second planar facesheets, said first and second planar face sheets separate from one another, said at least one structural foam stiffener between sidewalls of adjacent flutes or between at least one of a respective top and bottom wall of said flutes and a respective first or second facesheet.

2. The method of claim 1, wherein:
   forming the flutes includes wrapping composite material around each of a plurality of mandrels.

3. The method of claim 1, wherein:
   sandwiching the at least one structural foam stiffener includes placing the at least one structural foam stiffener only between walls of adjacent ones of the flutes.

4. The method of claim 1, including:
   sandwiching a plurality of structural foam stiffeners respectively between the walls of adjacent ones of the flutes.

5. The method of claim 1, wherein the composite truss panel comprises a cryogenic fuel tank.

6. The method of claim 1, wherein the structural foam stiffener comprises a high temperature foam having a density between approximately 2 and 6 pounds per cubic foot.

7. The method of claim 1, wherein the first and second facesheets diverge relative to each other.

8. The method of claim 1, wherein the fluted core sidewalls extend between the first and second facesheets.

9. The method of claim 1, wherein the forming the flutes includes wrapping composite material around each of a plurality of inflatable or solid mandrels.

10. The method of claim 1, wherein the flutes have an isosceles trapezoidal shape.

11. The method of claim 1, wherein the structural foam comprises a material selected from the group consisting of polymethacrylimide and polyisocyanurate.

12. The method of claim 1, wherein an adhesive film is between at least one of a respective top and bottom wall of said flutes and a respective first or second facesheet.

13. A method of making a composite truss panel, comprising:
   forming a composite fluted core;
   forming a first sandwich by placing the fluted core between the first and second planar facesheets, said first and second planar face sheets separate from one another; and,
   forming a second sandwich by placing at least one structural foam stiffener between walls of the fluted core.

14. The method of claim 13, wherein forming a fluted composite core includes:
   wrapping composite prepreg around each of a plurality of mandrels, and
   stacking the wrapped mandrels together.

15. The method of claim 14, wherein forming a second sandwich includes sandwiching structural foam stiffeners respectively between adjacent walls of the wrapped mandrels.

16. The method of claim 15, wherein forming the second sandwich includes:
sandwiching a structural foam stiffener between the stack of wrapped mandrels and at least one of the first and second facesheets.

17. The method of claim 15, further comprising:
co-curing the first and second facesheets and the fluted core; and,
removing the mandrels after first and second facesheets and the fluted core have been co-cured.

18. A method of making a composite truss panel, comprising:
forming a plurality of flutes by wrapping each of a plurality of mandrels with composite prepreg;
placing low density foam stiffeners respectively between walls of adjacent ones of the flutes;
stacking the flutes together;
sandwiching the stacked flutes between first and second planar facesheets, said first and second planar face sheets separate from one another;
co-curing the stacked flutes;
removing the mandrels from the stacked flutes after the stacked flutes have been cured.

* * * * *